US011251929B2

(12) United States Patent
Li et al.

(10) Patent No.: US 11,251,929 B2
(45) Date of Patent: Feb. 15, 2022

(54) RESOURCE INDICATION METHOD, DEVICE, AND SYSTEM

(71) Applicant: HUAWEI TECHNOLOGIES CO., LTD., Guangdong (CN)

(72) Inventors: Hua Li, Shanghai (CN); Xinxian Li, Shanghai (CN); Hao Tang, Shanghai (CN); Zhenfei Tang, Ottawa (CA); Fan Wang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 30 days.

(21) Appl. No.: 16/673,233

(22) Filed: Nov. 4, 2019

(65) Prior Publication Data
US 2020/0067688 A1 Feb. 27, 2020

Related U.S. Application Data

(63) Continuation of application No. PCT/CN2018/083233, filed on Apr. 16, 2018.

(30) Foreign Application Priority Data

May 5, 2017 (CN) .......................... 201710314158.X

(51) Int. Cl.
H04L 5/00 (2006.01)
H04L 27/26 (2006.01)
H04W 72/04 (2009.01)

(52) U.S. Cl.
CPC ........ H04L 5/0094 (2013.01); H04L 27/2607 (2013.01); H04W 72/0453 (2013.01); H04W 72/0493 (2013.01)

(58) Field of Classification Search
None
See application file for complete search history.

(56) References Cited

U.S. PATENT DOCUMENTS

2012/0275428 A1\* 11/2012 Feng .................... H04L 5/0064
370/330
2014/0198745 A1  7/2014 Fei
(Continued)

FOREIGN PATENT DOCUMENTS

CN  101272615 A  9/2008
CN  102118218 A  7/2011
(Continued)

OTHER PUBLICATIONS

Huawei et al: "Resource allocation and indication for data channel", 3GPP Draft; R1-1705069, vol. RAN WG1 No. Spokane, USA;Apr. 3, 2017-Apr. 7, 2017, Apr. 2, 2017, XP051243200, 8 pages.
(Continued)

Primary Examiner — Saumit Shah
(74) Attorney, Agent, or Firm — Womble Bond Dickinson (US) LLP

(57) ABSTRACT

A resource indication method, a device, and a system relate to the field of communications technologies. The method includes: allocating, by a base station, a BP to a terminal device, and sending, to the terminal device, a first message indicating a resource position of the BP; and receiving, by the terminal device, the first message sent by the base station, and then determining the resource position of the BP based on resource position information of at least one sub-BP, where the BP includes the at least one sub-BP, the BP is not greater than a maximum bandwidth supported by the terminal device, and the first message includes the resource position information of the at least one sub-BP. The BP is allocated by using a sub-BP as a granularity, so that signaling overheads can be reduced while a requirement for more flexible resource allocation is satisfied.

15 Claims, 7 Drawing Sheets

(56) References Cited

U.S. PATENT DOCUMENTS

| | | | |
|---|---|---|---|
| 2017/0019163 | A1 | 1/2017 | Yoshimoto et al. |
| 2018/0183551 | A1* | 6/2018 | Chou ...................... H04L 5/001 |
| 2019/0014577 | A1* | 1/2019 | Yang ..................... H04L 5/0053 |
| 2019/0342782 | A1* | 11/2019 | Yum ..................... H04L 5/0094 |

FOREIGN PATENT DOCUMENTS

| | | |
|---|---|---|
| CN | 103379630 A | 10/2013 |
| CN | 105991270 A | 10/2016 |
| CN | 106130705 A | 11/2016 |
| EP | 2916602 A1 | 9/2015 |
| EP | 3567916 A1 | 11/2019 |
| WO | 2012151971 A1 | 11/2012 |

OTHER PUBLICATIONS

Huawei et al., "WF on resource allocation for data transmission", 3GPP TSG RAN WG1 Meeting #88 R1-1703781, Athens, Greece Feb. 13-17, 2017, total 2 pages.

Huawei et al: "Scheduling and resource allocation mechanism for active bandwidth parts", 3GPP Draft R1-1709974, vol. RAN WG1 No. Qingdao, China; Jun. 27, 2017-Jun. 30, 2017, Jun. 17, 2017, XP051304714, 8 pages.

\* cited by examiner

RESOURCE INDICATION METHOD, DEVICE, AND SYSTEM

CROSS-REFERENCE TO RELATED APPLICATIONS

This application is a continuation of International Application No. PCT/CN2018/083233, filed on Apr. 16, 2018, which claims priority to Chinese Patent Application No. 201710314158.X, filed on May 5, 2017. The disclosures of the aforementioned applications are herein incorporated by reference in their entireties.

TECHNICAL FIELD

This application relates to the field of communications technologies, and in particular, to a resource indication method, a device, and a system.

BACKGROUND

In long term evolution (LTE), during initial access, a terminal device determines a downlink system bandwidth by receiving a message of a physical broadcast channel (PBCH). Then, a base station allocates a resource to the terminal device based on the system bandwidth. Specifically, in LTE, the base station may allocate the resource to the terminal device based on types: a type 0, a type 1, and a type 2. A resource block group (RBG) is used as a granularity of the resource allocated by the base station to the terminal device. When allocating the resource to the terminal device based on the type 0 and the type 1, the base station indicates the resource to the terminal device by using a bitmap. Using the type 0 as an example, if a specific RBG is allocated to the terminal device, a corresponding bit in the bitmap is set to 1; otherwise, the corresponding bit is set to 0.

In the prior art, the terminal device and the base station pre-agree upon a mapping relationship between an RBG size and a system bandwidth, as shown in Table 0. Therefore, the terminal device can determine, based on the system bandwidth and the bitmap that is sent by the base station, the resource allocated by the base station to the terminal device.

TABLE 0

| System bandwidth ($N_{RB}^{DL}$) | RBG size (P) |
| --- | --- |
| 10 | 1 |
| 11-26 | 2 |
| 27-63 | 3 |
| 64-110 | 4 |

However, in new radio (NR), a maximum bandwidth supported by a terminal device is usually less than a system bandwidth or a carrier bandwidth. Therefore, due to a limitation of the maximum bandwidth supported by the terminal device, the manner in LTE cannot be used to allocate a resource to the terminal device. To resolve the foregoing problem, a two-step resource allocation manner is provided in NR. In a first step, a base station allocates, to the terminal device, a segment of bandwidth less than or equal to the maximum bandwidth supported by the terminal device. In a second step, the base station and the terminal device transmit physical channel information and/or physical signal information on the allocated bandwidth. In view of this, this application provides a resource indication manner, to resolve a problem of bandwidth allocation to the terminal device in the first step.

SUMMARY

This application provides a resource indication method, a device, and a system, to satisfy a requirement for more flexible resource allocation and reduce overheads of system signaling when a bandwidth supported by a terminal device is less than a system bandwidth.

According to a first aspect, an embodiment of this application provides a resource indication method, including:

allocating, by a network device, a bandwidth part (BP) to a terminal device, and sending, to the terminal device, a first message indicating a resource position of the BP, where the BP includes at least one sub-BP, the BP is not greater than a maximum bandwidth supported by the terminal device, and the first message includes resource position information of the at least one sub-BP.

The BP is allocated to the terminal device by allocating the sub-BP to the terminal device, helping to satisfy a requirement for flexible resource allocation. The resource position of the BP is indicated by using the resource position information of the at least one sub-BP, helping to reduce signaling overheads.

Based on the first aspect, in an embodiment, a size of the at least one sub-BP is a sub-BP size included in a first sub-BP size set, and the first sub-BP size set includes at least one sub-BP size.

The first sub-BP size set corresponds to a first carrier frequency range, and the first carrier frequency range includes a carrier frequency used for signal transmission between the network device and the terminal device; or the first sub-BP size set corresponds to a first system bandwidth range, and the first system bandwidth range includes a system bandwidth of the network device; or the first sub-BP size set is a pre-defined sub-BP size set.

The size of the sub-BP can be configured for terminal devices in a same cell by using the system bandwidth, the carrier frequency, or the pre-defined sub-BP size set, helping to reduce the signaling overheads.

It should be noted that, in this embodiment of this application, the size of the sub-BP is a size of a bandwidth of the sub-BP in frequency domain.

Based on the first aspect, in an embodiment, each of the at least one sub-BP has a same size.

Based on the first aspect, in an embodiment, the network device sends first indication information to the terminal device, where the first indication information is used to indicate the size of the at least one sub-BP.

The size of the at least one sub-BP is indicated by using the first indication information, saving more memory space of the terminal device than that saved when a sub-BP size is preconfigured in the terminal device.

Based on the first aspect, in an embodiment, the resource position information of the at least one sub-BP is a start number and an end number of the sub-BP included in the BP; or the resource position information of the at least one sub-BP is a start number of the sub-BP included in the BP and a quantity of sub-BPs included in the BP.

The resource position of the BP is indicated by using the start number and the end number of the sub-BP or by using the start number of the sub-BP and the quantity of sub-BPs included in the BP, helping to reduce the signaling overheads.

Based on the first aspect, in an embodiment, the network device sends second indication information to the terminal device, where the second indication information is used to indicate a size of the at least one sub-BP, the size of the at least one sub-BP is a sub-BP size included in a second sub-BP size set, the second sub-BP size set includes at least one sub-BP size, and the second sub-BP size set corresponds to a first bandwidth range.

The first bandwidth range includes the maximum bandwidth supported by the terminal device; or the first bandwidth range includes a size of a bandwidth reported by the terminal device to the network device.

The size of the sub-BP is configured based on the maximum bandwidth supported by the terminal device or the size of the bandwidth reported by the terminal device to the network device, better facilitating flexible configuration for different terminal devices.

Based on the first aspect, in an embodiment, the resource position information of the at least one sub-BP is a start frequency domain position of the BP and a quantity of sub-BPs included in the BP.

Based on the first aspect, in an embodiment, the BP corresponds to a configuration parameter, and the configuration parameter includes a subcarrier spacing, a time unit type, or a cyclic prefix CP type.

The foregoing technical solution helps to reduce the signaling overheads.

Based on the first aspect, in an embodiment, the sub-BP corresponds to a configuration parameter, and the configuration parameter includes a subcarrier spacing, a time unit type, or a CP type.

The foregoing technical solution facilitates the flexible configuration for different terminal devices.

According to a second aspect, an embodiment of this application provides a resource indication method, including:

receiving, by a terminal device, a first message that is sent by a network device and that indicates a resource position of a bandwidth part BP, and determining the resource position of the BP based on resource position information of at least one sub-BP, where the BP includes the at least one sub-BP, and the first message includes the resource position information of the at least one sub-BP.

The resource position of the BP is indicated by using the resource position information of the at least one sub-BP, helping to reduce signaling overheads. The BP is allocated to the terminal device by allocating the sub-BP, helping to satisfy a requirement for flexible resource allocation.

Based on the second aspect, in an embodiment, a size of the at least one sub-BP is a sub-BP size included in a first sub-BP size set, and the first sub-BP size set includes at least one sub-BP size.

The first sub-BP size set corresponds to a first carrier frequency range, and the first carrier frequency range includes a carrier frequency used for signal transmission between the network device and the terminal device; or the first sub-BP size set corresponds to a first system bandwidth range, and the first system bandwidth range includes a system bandwidth of the network device; or the first sub-BP size set is a pre-defined sub-BP size set.

The size of the sub-BP can be configured by using the system bandwidth, the carrier frequency, or the pre-defined sub-BP size set, helping to reduce the signaling overheads.

Based on the second aspect, in an embodiment, each of the at least one sub-BP has a same size.

Based on the second aspect, in an embodiment, the terminal device receives first indication information sent by the network device, where the first indication information is used to indicate the size of the at least one sub-BP.

The size of the at least one sub-BP is indicated by using the first indication information, saving more memory space of the terminal device than that saved when a sub-BP size is preconfigured in the terminal device.

Based on the second aspect, in an embodiment, the resource position information of the at least one sub-BP is a start number and an end number of the sub-BP included in the BP; or the resource position information of the at least one sub-BP is a start number of the sub-BP included in the BP and a quantity of sub-BPs included in the BP.

The resource position of the BP is indicated by using the start number and the end number of the sub-BP or by using the start number of the sub-BP and the quantity of sub-BPs included in the BP, helping to reduce the signaling overheads.

Based on the second aspect, in an embodiment, the terminal device receives second indication information sent by the network device, where the second indication information is used to indicate a size of the at least one sub-BP, the size of the at least one sub-BP is a sub-BP size included in a second sub-BP size set, the second sub-BP size set includes at least one sub-BP size, and the second sub-BP size set corresponds to a first bandwidth range.

The first bandwidth range includes a maximum bandwidth supported by the terminal device; or the first bandwidth range includes a size of a bandwidth reported by the terminal device to the network device.

The size of the sub-BP is configured based on the maximum bandwidth supported by the terminal device or the size of the bandwidth reported by the terminal device to the network device, better facilitating flexible configuration for different terminal devices.

Based on the second aspect, in an embodiment, the resource position information of the at least one sub-BP is a start frequency domain position of the BP and a quantity of sub-BPs included in the BP.

Based on the second aspect, in an embodiment, the BP corresponds to a BP configuration parameter, and the BP configuration parameter includes a subcarrier spacing, a time unit type, or a cyclic prefix CP type.

The foregoing technical solution helps to reduce the signaling overheads.

Based on the second aspect, in an embodiment, the sub-BP corresponds to a BP configuration parameter, and the BP configuration parameter includes a subcarrier spacing, a time unit type, or a CP type.

The foregoing technical solution facilitates the flexible configuration for different terminal devices.

According to a third aspect, a network device is provided. The network device includes a processing module and a sending module. The processing module is configured to allocate a bandwidth part BP to a terminal device, where the BP includes at least one sub-BP, and the BP is not greater than a maximum bandwidth supported by the terminal device. The sending module is configured to send, to the terminal device, a first message indicating a resource position of the BP, where the first message includes resource position information of the at least one sub-BP.

Based on the third aspect, in an embodiment, a size of the at least one sub-BP is a sub-BP size included in a first sub-BP size set, and the first sub-BP size set includes at least one sub-BP size.

The first sub-BP size set corresponds to a first carrier frequency range, and the first carrier frequency range includes a carrier frequency used for signal transmission between the network device and the terminal device; or the first sub-BP size set corresponds to a first system bandwidth range, and the first system bandwidth range includes a system bandwidth of the network device; or the first sub-BP size set is a pre-defined sub-BP size set.

Based on the third aspect, in an embodiment, each of the at least one sub-BP has a same size.

Based on the third aspect, in an embodiment, the sending module is further configured to send first indication information to the terminal device, where the first indication information is used to indicate the size of the at least one sub-BP.

Based on the third aspect, in an embodiment, the resource position information of the at least one sub-BP is a start number and an end number of the sub-BP included in the BP; or the resource position information of the at least one sub-BP is a start number of the sub-BP included in the BP and a quantity of sub-BPs included in the BP.

Based on the third aspect, in an embodiment, the sending module is further configured to send second indication information to the terminal device, where the second indication information is used to indicate a size of the at least one sub-BP, the size of the at least one sub-BP is a sub-BP size included in a second sub-BP size set, the second sub-BP size set includes at least one sub-BP size, and the second sub-BP size set corresponds to a first bandwidth range.

The first bandwidth range includes the maximum bandwidth supported by the terminal device; or the first bandwidth range includes a size of a bandwidth reported by the terminal device to the network device.

Based on the third aspect, in an embodiment, the resource position information of the at least one sub-BP is a start frequency domain position of the BP and a quantity of sub-BPs included in the BP.

Based on the third aspect, in an embodiment, the BP corresponds to a configuration parameter, and the configuration parameter includes a subcarrier spacing, a time unit type, or a cyclic prefix CP type.

Based on the third aspect, in an embodiment, the sub-BP corresponds to a configuration parameter, and the configuration parameter includes a subcarrier spacing, a time unit type, or a CP type.

It should be noted that, in any one of the third aspect or the possible designs of the third aspect, the processing module corresponds to a processor in a hardware device, and the sending module corresponds to a transmitter in a hardware module.

According to a fourth aspect, an embodiment of this application provides a terminal device, including a processing module and a receiving module. The receiving module is configured to receive a first message that is sent by a network device and that indicates a resource position of a bandwidth part BP, where the BP includes at least one sub-BP, and the first message includes resource position information of the at least one sub-BP. The processing module is configured to determine the resource position of the BP based on the resource position information of the at least one sub-BP.

Based on the fourth aspect, in an embodiment, a size of the at least one sub-BP is a sub-BP size included in a first sub-BP size set, and the first sub-BP size set includes at least one sub-BP size.

The first sub-BP size set corresponds to a first carrier frequency range, and the first carrier frequency range includes a carrier frequency used for signal transmission between the network device and the terminal device; or the first sub-BP size set corresponds to a first system bandwidth range, and the first system bandwidth range includes a system bandwidth of the network device; or the first sub-BP size set is a pre-defined sub-BP size set.

Based on the fourth aspect, in an embodiment, each of the at least one sub-BP has a same size.

Based on the fourth aspect, in an embodiment, the receiving module is further configured to receive first indication information sent by the network device, where the first indication information is used to indicate the size of the at least one sub-BP.

Based on the fourth aspect, in an embodiment, the resource position information of the at least one sub-BP is a start number and an end number of the sub-BP included in the BP; or the resource position information of the at least one sub-BP is a start number of the sub-BP included in the BP and a quantity of sub-BPs included in the BP.

Based on the fourth aspect, in an embodiment, the receiving module is further configured to receive second indication information sent by the network device, where the second indication information is used to indicate a size of the at least one sub-BP, the size of the at least one sub-BP is a sub-BP size included in a second sub-BP size set, the second sub-BP size set includes at least one sub-BP size, and the second sub-BP size set corresponds to a first bandwidth range.

The first bandwidth range includes a maximum bandwidth supported by the terminal device; or the first bandwidth range includes a size of a bandwidth reported by the terminal device to the network device.

Based on the fourth aspect, in an embodiment, the resource position information of the at least one sub-BP is a start frequency domain position of the BP and a quantity of sub-BPs included in the BP.

Based on the fourth aspect, in an embodiment, the BP corresponds to a configuration parameter, and the configuration parameter includes a subcarrier spacing, a time unit type, or a CP type.

Based on the fourth aspect, in an embodiment, the sub-BP corresponds to a configuration parameter, and the configuration parameter includes a subcarrier spacing, a time unit type, or a CP type.

It should be noted that, in any one of the fourth aspect or the possible designs of the fourth aspect, the processing module corresponds to a processor in a hardware device, and the receiving module corresponds to a receiver in a hardware module.

According to a fifth aspect, an embodiment of this application further provides a network device, including a processor, a transceiver, and a memory. The memory is configured to store a program instruction and information received and sent by the transceiver. The processor is configured to execute the program instruction stored in the memory, to implement the technical solution according to any one of the first aspect of this embodiment of this application or the possible designs of the first aspect.

According to a sixth aspect, an embodiment of this application further provides a computer storage medium, configured to store a program of the technical solution according to any one of the first aspect or the possible designs of the first aspect.

According to a seventh aspect, an embodiment of this application provides a chip. The chip is coupled to a transceiver in a network device, to perform the technical solution according to any one of the first aspect of this embodiment of this application or the possible designs of the first aspect. It should be understood that "coupled" in this embodiment of this application indicates a direct combination or an indirect combination between two parts. The combination may be fixed or movable, and the combination may allow communication of fluid, electricity, an electrical signal, or another type of signal between the two parts.

According to an eighth aspect, an embodiment of this application further provides a terminal device, including a processor, a transceiver, and a memory. The memory is configured to store a program instruction and information received and sent by the transceiver. The processor is configured to execute the program instruction stored in the memory, to implement the technical solution according to any one of the second aspect of this embodiment of this application or the possible designs of the second aspect.

According to a ninth aspect, an embodiment of this application further provides a computer storage medium, configured to store a program of the technical solution according to any one of the second aspect or the possible designs of the second aspect.

According to a tenth aspect, an embodiment of this application further provides a chip. The chip is coupled to a transceiver in a terminal device, to perform the technical solution according to any one of the second aspect of this embodiment of this application or the possible designs of the second aspect. It should be understood that "coupled" in this embodiment of this application indicates a direct combination or an indirect combination between two parts. The combination may be fixed or movable, and the combination may allow communication of fluid, electricity, an electrical signal, or another type of signal between the two parts.

According to an eleventh aspect, an embodiment of this application provides a communications system, including the network device according to any one of the third aspect or the possible designs of the third aspect and the terminal device according to any one of the fourth aspect or the possible designs of the fourth aspect.

DESCRIPTION OF EMBODIMENTS

The embodiments of this application are described in detail below with reference to the accompanying drawings.

It should be understood that, the embodiments of this application may be applied to, but are not limited to, multi-subcarrier spacing communications systems, for example, an NR system and an LTE system.

It should be understood that a network device in the embodiments of this application may be a base station, an access point, or a device in communication with a wireless terminal by using one or more sectors on an air interface in an access network. When the network device is a base station, the base station may be configured to mutually convert a received over-the-air frame and an Internet protocol (IP) packet, and is used as a router between the wireless terminal and a remaining part of the access network. The remaining part of the access network may include an IP network. The base station may also be configured to coordinate attribute management of the air interface. For example, the base station may be a base transceiver station (BTS) in a GSM or a CDMA system, may be a NodeB in wideband code division multiple access (WCDMA), or may be an evolved NodeB (evolutional Node B, eNB) in the LTE system. This is not limited in the embodiments of this application.

It should be understood that a terminal device in the embodiments of this application may be a device configured to provide voice and/or data connectivity for a user, a handheld device with a wireless connection function, or another processing device connected to a wireless modem. Alternatively, the terminal may be a wireless terminal. The wireless terminal may communicate with one or more core networks through a radio access network (RAN). The wireless terminal may be a mobile terminal, such as a mobile phone (or referred to as a "cellular" phone) or a computer with a mobile terminal. For example, the computer with a mobile terminal may be a portable, pocket-sized, handheld, computer built-in, or in-vehicle mobile apparatus, which exchanges voice and/or data with the radio access network. For example, the wireless terminal may alternatively be a device such as a personal communication service (PCS) phone, a cordless telephone set, a session initiation protocol (Session Initiation Protocol, SIP) phone, a wireless local loop (WLL) station, or a personal digital assistant (PDA). The wireless terminal may also be referred to as a system, a subscriber unit (Subscriber Unit), a subscriber station, a mobile station, a mobile console (Mobile), a remote station, an access point (AP), a remote terminal, an access terminal, a user terminal, a user agent, a user device, user equipment, or the like. This is not limited in the embodiments of this application.

Figure 1A:
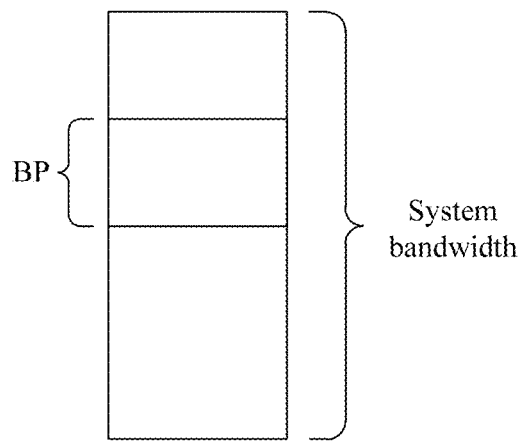
FIG. 1a to FIG. 1c are a schematic diagram of a BP according to an embodiment of this application.
Figure 1B:
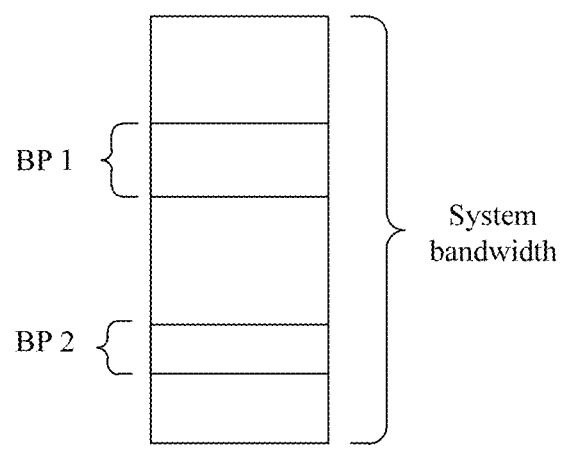
Figure 1C:
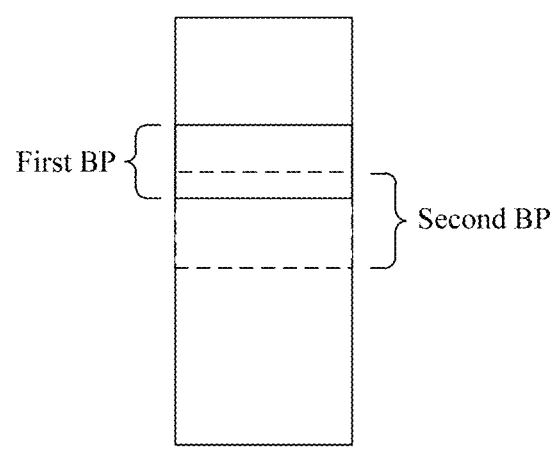

It should be understood that, a BP in the embodiments of this application is a segment of bandwidth contiguous or noncontiguous in frequency domain. The segment of contiguous or noncontiguous bandwidth is less than or equal to a maximum bandwidth supported by the terminal device in frequency domain, and may be used to transmit physical channel information or physical signal information. The physical channel information includes physical uplink/downlink control channel information and physical uplink/downlink shared channel information. For example, as shown in FIG. 1a, the BP is a segment of contiguous bandwidth in an entire communications system bandwidth. As shown in FIG. 1b, the BP in the embodiments of this application is noncontiguous bandwidths in an entire communications system bandwidth. Specifically, a BP 1 and a BP 2 shown in FIG. 1b form the BP, and the BP 1 and the BP 2 are noncontiguous. It should be noted that, in the embodiments of this application, BPs allocated by the base station to different terminal devices may overlap in frequency domain. For example, as shown in FIG. 1c, a first BP is a bandwidth allocated by the base station to a terminal device 1, and a second BP is a bandwidth allocated by the base station to a terminal device 2.

Figure 2:
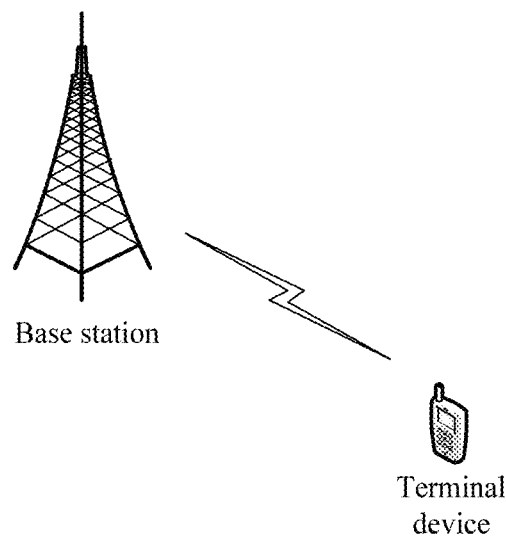
FIG. 2 is a schematic architectural diagram of a communications system according to an embodiment of this application.

For ease of description, in the embodiments of this application, detailed descriptions are provided by using an example in which the network device is a base station. This is merely an example in the embodiments of this application. When the network device is another device, descriptions are similar to those when the network device is a base station, and details are not described herein again. Specifically, FIG. 2 is an architectural diagram of a communications system according to an embodiment of this application. The communications system includes a base station and a terminal device.

A resource indication method in the embodiments of this application is described in detail by using an architecture of the communications system shown in FIG. 2.

Figure 3:
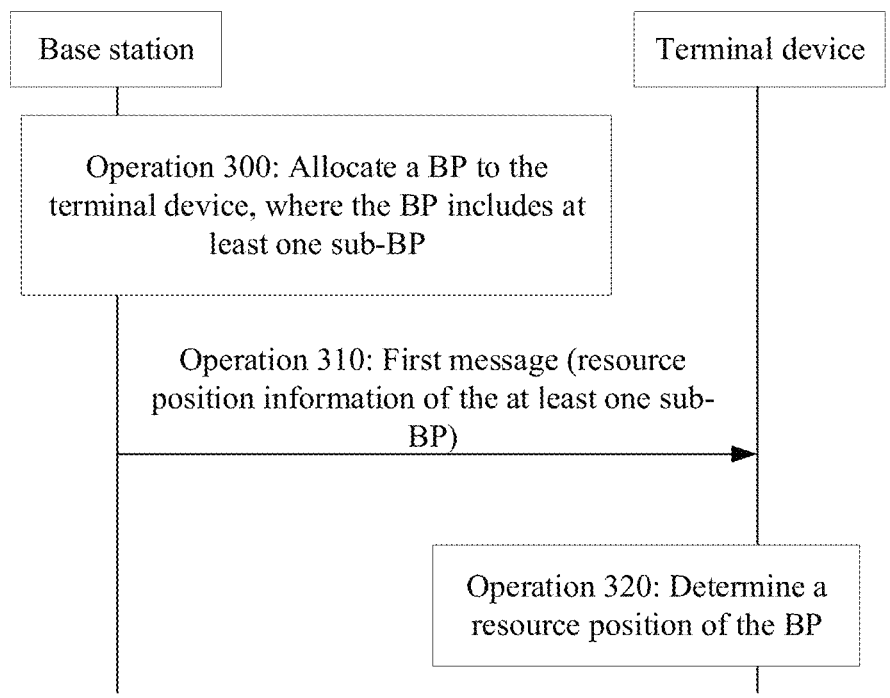
FIG. 3 is a schematic flowchart of a resource indication method according to an embodiment of this application.

As shown in FIG. 3, a resource indication method in an embodiment of this application includes the following operations.

In operation 300, a base station allocates a BP to a terminal device, where the BP includes at least one sub-BP, and the BP is not greater than a maximum bandwidth supported by the terminal device.

In operation 310, the base station sends, to the terminal device, a first message indicating a resource position of the BP, and the terminal device receives the first message sent by the base station, where the first message includes resource position information of the at least one sub-BP.

In operation 320, the terminal device determines the resource position of the BP based on the resource position information of the at least one sub-BP.

It should be noted that, in this embodiment of this application, the sub-BP may also be referred to as a mini BP, a BP unit, a BP sub-band, or the like. A name of the sub-BP is not limited in this embodiment of this application. The sub-BP includes a segment of contiguous physical resource blocks (PRB). Alternatively, the sub-BP is a resource unit on a fixed bandwidth in frequency domain. Alternatively, the sub-BP includes a segment of contiguous resource units on a fixed bandwidth. A size of the sub-BP is not greater than the maximum bandwidth supported by the terminal device. In this embodiment of this application, the size of the sub-BP is a bandwidth occupied by the sub-BP in frequency domain.

In this embodiment of this application, the BP is allocated by using the sub-BP as a granularity. For example, if needing to allocate a BP of 20 MHz to the terminal device, the base station may allocate the at least one sub-BP to the terminal device to satisfy a requirement of the terminal device. Therefore, a requirement for more flexible resource allocation can be satisfied, and signaling overheads can be reduced.

In this embodiment of this application, the base station may configure a size of the at least one sub-BP in the following manners. When each of the at least one sub-BP has a same size, the manners are specifically as follows:

Example 1

The size of the at least one sub-BP included in the BP is a sub-BP size included in a first sub-BP size set. The first sub-BP size set includes at least one sub-BP size, the first sub-BP size set corresponds to a first carrier frequency range, and the first carrier frequency range includes a carrier frequency used for signal transmission between the base station and the terminal device. For example, in LTE, the carrier frequency used for the signal transmission between the base station and the terminal device is a carrier frequency used by a cell in which the terminal device is located.

It should be noted that, in Example 1, the sub-BP set corresponds to the carrier frequency range. Therefore, the base station can determine the first carrier frequency range based on the carrier frequency used for the signal transmission between the base station and the terminal device, and select a sub-BP size, as the size of the at least one sub-BP, from the first sub-BP size set corresponding to the first carrier frequency range. For example, a correspondence between a sub-BP size and a carrier frequency range is shown in Table 1. The carrier frequency is represented by F, and is measured in gigahertz GHz:

TABLE 1

| Carrier frequency range | 0 < F < 6 | 6 ≤ F < 28 | F ≥ 28 |
|---|---|---|---|
| Sub-BP size set | {5 megahertz MHz} | {20 MHz} | {40 MHz} |

To be specific, as shown in Table 1, when the carrier frequency range is 0<F<6 GHz, a corresponding sub-BP size set is {5 MHz}, and a sub-BP size included in the sub-BP size set is 5 MHz. When the carrier frequency range is 6 GHz≤F<28 GHz, a corresponding sub-BP size set is {20 MHz}, and a sub-BP size included in the sub-BP size set is 20 MHz. When the carrier frequency range is F≥28 GHz, a corresponding sub-BP size set is {50 MHz}, and a sub-BP size included in the sub-BP size set is 40 MHz. When the carrier frequency used by the cell in which the terminal device is located is 5 GHz, the first carrier frequency range is 0<F<6 GHz, and the size of the at least one sub-BP is 5 MHz. If the base station allocates a BP of 20 MHz to the terminal device, the base station only needs to allocate four sub-BPs of 5 MHz to the terminal device.

It should be understood that, the correspondence between the sub-BP size set and the carrier frequency range is merely used as an example for description. In this embodiment of this application, a specific correspondence between a sub-BP size set and a carrier frequency range is not limited.

In Example 1, the carrier frequency range may include one or more carrier frequencies, and the sub-BP size set may include one or more sub-BP sizes. This is not limited in this embodiment of this application.

Example 2

The size of the at least one sub-BP included in the BP is a sub-BP size included in a first sub-BP size set. The first sub-BP size set includes at least one sub-BP size, the first sub-BP size set corresponds to a first system bandwidth range, and the first system bandwidth range includes a system bandwidth of the network device. For example, in LTE, the system bandwidth of the network device is a system bandwidth of a cell in which the terminal device is located.

It should be noted that, in Example 2, the sub-BP set corresponds to the system bandwidth range. Therefore, the base station can determine a first carrier frequency range based on the system bandwidth of the network device, and select a sub-BP size, as the size of the at least one sub-BP, from the first sub-BP size set corresponding to the first carrier frequency range. For example, a correspondence between a sub-BP size and a system bandwidth range is shown in Table 2. The system bandwidth is also referred to as a carrier bandwidth, is represented by CBW, and is measured in MHz:

TABLE 2

| System bandwidth range | 0 < CBW < 100 | 100 ≤ CBW < 200 | F ≥ 200 |
|---|---|---|---|
| Sub-BP size set | {5 MHz} | {20 MHz} | {40 MHz} |

To be specific, as shown in Table 1, when the system bandwidth range is 0<CBW<100 MHz, a corresponding sub-BP size set is {5 MHz}, and a sub-BP size included in the sub-BP size set is 5 MHz. When the system bandwidth range is 100 MHz≤CBW<200 MHz, a corresponding sub-BP size set is {20 MHz}, and a sub-BP size included in the sub-BP size set is 20 MHz. When the system bandwidth range is CBW≥200 MHz, a corresponding sub-BP size set is {50 MHz}, and a sub-BP size included in the sub-BP size set is 40 MHz. When the system bandwidth of the cell in which the terminal device is located is 150 MHz, the first system bandwidth range is 100≤CBW<200, and the size of the at least one sub-BP is 20 MHz. If the base station allocates a BP of 40 MHz to the terminal device, the base station only needs to allocate two sub-BPs of 20 MHz to the terminal device.

It should be understood that, the correspondence between the sub-BP size set and the system bandwidth range is merely used as an example for description. In this embodiment of this application, a specific correspondence between a sub-BP size set and a system bandwidth range is not limited.

In Example 2, the system bandwidth range may include one or more system bandwidths, and the sub-BP size set may include one or more sub-BP sizes. This is not limited in this embodiment of this application.

Example 3

The size of the at least one sub-BP included in the BP is a sub-BP size included in a first sub-BP size set. The first sub-BP size set includes at least one sub-BP size, and the first sub-BP size set is a pre-defined sub-BP size set.

It should be noted that, the pre-defined sub-BP size set may include one sub-BP size, or may include a plurality of sub-BP sizes. This is not limited in this embodiment of this application. For example, the pre-defined sub-BP size set is {5 MHz}; or the pre-defined sub-BP size set is {5 MHz, 20 MHz}.

In Example 1, Example 2, and Example 3, the size of the sub-BP is common, and sizes of sub-BPs for at least two terminal devices are the same. Therefore, sub-BP size configuration manners in Example 1, Example 2, and Example 3 are on a common level, and the sub-BP size configuration manner may be preconfigured into the base station and the terminal device. Using Example 1 as an example, the correspondence between the sub-BP size set and the carrier frequency range is preconfigured in the base station and the terminal device. After the base station sends the first message to the terminal device, the terminal device may search the preconfigured correspondence between the sub-BP size set and the carrier frequency range for a sub-BP size set corresponding to a carrier frequency range to which the carrier frequency used by the cell in which the terminal device is located belongs, and determine, based on a sub-BP size in the determined sub-BP size set and the resource position that is of the BP and that is determined based on the first message, the resource position of the BP allocated by the base station to the terminal device. In addition, Example 2 and Example 3 are similar to Example 1, and details are not described herein one by one.

It should be noted that, when the sub-BP size set in the correspondence preconfigured in both the base station and the terminal device includes only one sub-BP size, the base station does not need to notify the terminal device of the sub-BP size. When the sub-BP size set in the preconfigured correspondence includes a plurality of sub-BP size, the base station needs to notify the terminal device of the sub-BP size that is of the at least one sub-BP and that is selected by the base station.

In another optional manner, the sub-BP size is configured into the base station. Using Example 1 as an example, the correspondence between the sub-BP size set and the carrier frequency range is preconfigured into the base station, and the base station notifies the terminal device of the size of the at least one sub-BP. Specifically, the base station sends first indication information to the terminal device, and the first indication information is used to indicate the size of the at least one sub-BP.

It should be noted that, specifically, the first indication information may be carried in a master information block (MIB), remaining minimum system information (RMSI), a system information block (SIB), other system information (OSI), radio resource control (RRC) signaling, or a media access control element (MAC CE), to notify the terminal device of the first indication information. For example, when the sub-BP set includes two sub-BPs, the first indication information may be one-bit. For example, if the first sub-BP size set is {5 MHz, 20 MHz}, 5 MHz is indicated by using a bit 0, and 20 MHz is indicated by using a bit 1. When the sub-BP set includes four sub-BPs, the first indication information may be two-bit or the like. In addition, the first indication information may alternatively be multi-bit. This is not limited herein.

Figure 4:
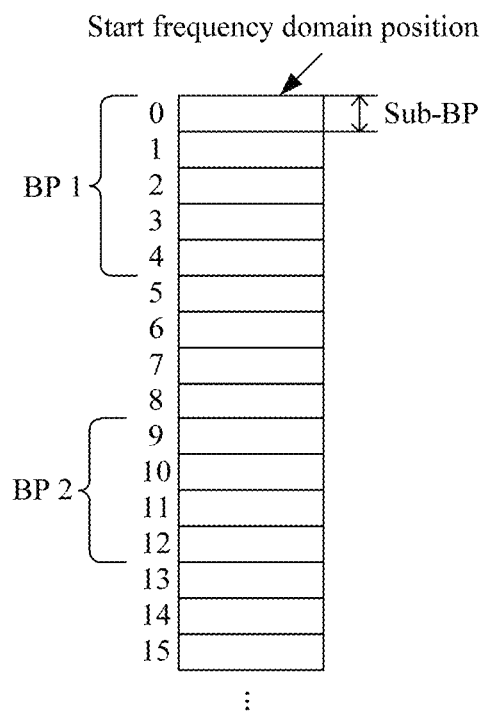
FIG. 4 is a schematic diagram of configuration of a sub-BP according to an embodiment of this application.

LTE is used as an example, and descriptions in another communications system is similar to those in LTE. Details are not described herein one by one. Based on the sub-BP size configuration manners in Example 1, Example 2, and Example 3, for terminal devices in a same cell, sub-BP sizes are the same. As shown in FIG. 4, a segment of resource contiguous or noncontiguous in frequency domain is divided based on the sub-BP size, and sub-BPs are numbered by starting from a low frequency domain position on the segment of contiguous or noncontiguous resource. Numbers of the sub-BPs are consecutive. Therefore, in this embodiment of this application, optionally, the resource position information of the at least one sub-BP may be a start number and an end number of the sub-BP. Using FIG. 4 as an example, assuming that a BP 1 is a BP allocated by the base station to a terminal device 1, because the BP 1 includes sub-BPs numbered 0 to 4, a start number of the sub-BPs in the BP 1 is 0, and an end number is 4. To reduce the signaling overheads, the terminal device may be notified that the start number of the sub-BPs in the BP 1 is 0 and the end number is 4. In addition, a resource position of the at least one sub-BP may be a start number of the sub-BP and a quantity of sub-BPs. Using FIG. 4 as an example, assuming that a BP 2 is a BP allocated by the base station to a terminal device 2, because the BP 2 includes sub-BPs numbered from 9 to 12, the base station may notify the terminal device of the number 9 of the sub-BPs and the quantity 4 of sub-BPs. Alternatively, numbers of sub-BPs included in one BP is nonconsecutive. Therefore, the resource position of the at least one sub-BP may alternatively be a combination of the foregoing numbers. Using FIG. 4 as an example, numbers 6, 7, and 14 are a BP allocated by the base station to a terminal device 3. Therefore, the resource position of the at least one sub-BP is the numbers 6, 7, and 14.

It should be noted that, the resource position information of the at least one sub-BP is not limited to the manners in the foregoing examples, and may alternatively be a start frequency domain position of the BP and the quantity of sub-BPs, the end number of the sub-BP and the quantity of sub-BPs, or the like. Details are not described herein one by one.

For the sub-BP size configuration manners in Example 1, Example 2, and Example 3, in this embodiment of this application, the base station may further start to allocate the sub-BP to the terminal device on any PRB. Therefore, a manner of numbering the sub-BP may further be shown in FIG. 4. It is assumed that the BP 1 is the BP allocated by the base station to the terminal device 1, and the BP 2 is the BP allocated by the base station to the terminal device 2. The base station separately numbers the sub-BPs allocated to the terminal device 1 and the sub-BPs allocated to the terminal device 2. In the numbering manner, resource position information of at least one sub-BP for the terminal device 1 is a start frequency domain position 1 and a quantity 5 of sub-BPs, and resource position information of at least one sub-BP for the terminal device 2 is a start frequency domain position 2 and a quantity 4 of sub-BPs.

In addition, in this embodiment of this application, the base station may alternatively configure the size of the sub-BP in the following manners. The manners are specifically as follows:

Example 4

The size of the at least one sub-BP is a sub-BP size included in a second sub-BP size set. The second sub-BP size set includes at least one sub-BP size, the second sub-BP size set corresponds to a first sub-bandwidth range, and the first sub-bandwidth range includes the maximum bandwidth supported by the terminal device.

It should be noted that, in Example 4, the maximum bandwidth supported by the terminal device is reported by the terminal device to the base station. In Example 4, the sub-BP set corresponds to a range of the maximum bandwidth supported by the terminal device. Therefore, the base station may determine the first bandwidth range based on the maximum bandwidth supported by the terminal device, and select a sub-BP size, as the size of the at least one sub-BP, from the second sub-BP set corresponding to the first sub-bandwidth range. For example, a correspondence between a sub-BP size set and a maximum bandwidth supported by the terminal device is shown in Table 3, and the maximum bandwidth supported by the terminal device may be represented by an alphabet W.

TABLE 3

| Maximum bandwidth (MHz) | 0 < W < 100 | 100 ≤ W < 150 | W ≥ 150 |
|---|---|---|---|
| Sub-BP size set | {5 MHz} | {20 MHz} | {40 MHz} |

To be specific, as shown in Table 3, when 0<W<100 MHz, a corresponding sub-BP size set is {5 MHz}, and a sub-BP size included in the sub-BP size set is 5 MHz. When 100 MHz≤W<150 MHz, a corresponding sub-BP size set is {20 MHz}, and a sub-BP size included in the sub-BP size set is 20 MHz. When W≥150 MHz, a corresponding sub-BP size set is {50 MHz}, and a sub-BP size included in the sub-BP size set is 40 MHz. When the maximum bandwidth supported by the terminal device is 200 MHz, the first sub-bandwidth range is W≥150, and the size of the at least one sub-BP is 40 MHz.

If the base station allocates a BP of 80 MHz to the terminal device, the base station only needs to allocate two sub-BPs of 40 MHz to the terminal device.

It should be understood that, the correspondence between the sub-BP size set and the maximum bandwidth supported by the terminal device is merely used as an example for description. In this embodiment of this application, a specific correspondence between a sub-BP size set and a maximum bandwidth supported by the terminal device is not limited.

In Example 4, the first sub-bandwidth range may include one or more bandwidths, and the sub-BP size set may include one or more sub-BP sizes. This is not limited in this embodiment of this application.

Example 5

The size of the at least one sub-BP is a sub-BP size included in a second sub-BP size set. The second sub-BP size set includes at least one sub-BP size, the second sub-BP size set corresponds to a first sub-bandwidth range, and the first sub-bandwidth range includes a size of a bandwidth reported by the terminal device to the base station.

It should be noted that, the bandwidth reported by the terminal device may be an expected BP size sent by the terminal device to the base station by using uplink information.

In Example 5, the sub-BP size set corresponds to a range of the size of the bandwidth reported by the terminal device to the base station. Therefore, the base station can determine the first sub-bandwidth range based on the size of the bandwidth reported by the terminal device, and select a sub-BP size, as the size of the at least one sub-BP, from the second sub-BP set corresponding to the first sub-bandwidth range. For example, a correspondence between a sub-BP size set and a size of a bandwidth reported by the terminal device is shown in Table 4, and the size of the bandwidth reported by the terminal device may be represented by alphabets BBW.

TABLE 4

| BBW (MHz) | 0 < BBW < 100 | 100 ≤ BBW < 200 | W ≥ 200 |
|---|---|---|---|
| Sub-BP size set | {5 MHz} | {20 MHz} | {40 MHz} |

To be specific, as shown in Table 4, when 0<BBW<100 MHz, a corresponding sub-BP size set is {5 MHz}, and a sub-BP size included in the sub-BP size set is 5 MHz. When 100 MHz≤BBW<200 MHz, a corresponding sub-BP size set is {20 MHz}, and a sub-BP size included in the sub-BP size set is 20 MHz. When BBW≥200 MHz, a corresponding sub-BP size set is {50 MHz}, and a sub-BP size included in the sub-BP size set is 40 MHz. When the size of the BP reported by the terminal device is 100 MHz, the first sub-bandwidth range is 100 MHz≤BBW<200 MHz, and the size of the at least one sub-BP is 20 MHz.

If the size of the bandwidth that is reported by the terminal device and that is received by the base station is 100 MHz, only five sub-BPs of 20 MHz need to be allocated to the terminal device.

It should be understood that, the correspondence between the sub-BP size set and the size of the bandwidth reported by the terminal device is merely used as an example for description. In this embodiment of this application, a specific correspondence between a subcarrier size set and a size of a bandwidth is not limited.

In Example 5, the first sub-bandwidth range may include one or more bandwidths, and the sub-BP size set may include one or more sub-BP sizes. This is not limited in this embodiment of this application.

For sub-BP size configuration manners in Example 4 and Example 5, different terminal devices may support different maximum bandwidths, or different terminal devices have different BP requirements. Therefore, sizes of bandwidths reported to the base station may be different, and sizes of bandwidths reported by a same terminal device to the terminal device may be different for different scenarios or services. Therefore, to enable the terminal device to obtain the size of the at least one sub-BP, optionally, the base station sends second indication information to the terminal device, and the second indication information is used to indicate the size of the at least one sub-BP.

Specifically, it should be noted that, specifically, the second indication information may be carried in a MIB, RMSI, a SIB, OSI, RRC signaling, or a MAC CE, to notify the terminal device of the second indication information. For example, when the sub-BP set includes two sub-BPs, the second indication information may be one-bit. For example, the first sub-BP size set is {5 MHz, 20 MHz}, 5 MHz is indicated by using a bit 0, and 20 MHz is indicated by using a bit 1. When the sub-BP set includes four sub-BPs, the second indication information may be two-bit or the like. In addition, the second indication information may alternatively be multi-bit. This is not limited herein.

Figure 5:
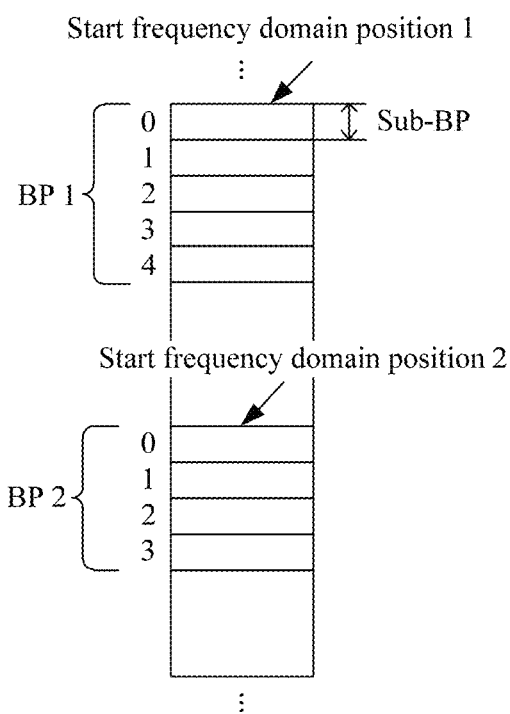
FIG. 5 is a schematic diagram of configuration of a sub-BP according to an embodiment of this application.

Sub-BP sizes configured for different terminal devices in the sub-BP size configuration manners in Example 4 and Example 5 may be the same or may be different. Therefore, the sub-BP size configuration manners in Example 4 and Example 5 are on a UE level, and a start frequency domain position of the BP may start from an edge of any PRB. Therefore, for Example 4 and Example 5, when the sub-BP is a segment of bandwidth contiguous in frequency domain, a manner of encoding the sub-BP may be shown in FIG. 5, and the resource position information of the at least one sub-BP is the start frequency domain position of the BP and a quantity of sub-BPs included in the BP. When the sub-BP is a segment of bandwidth noncontiguous in frequency domain, the resource position information of the at least one sub-BP may be a start frequency domain position on each segment of bandwidth and a quantity of sub-BPs on each bandwidth. In this embodiment of this application, a specific implementation of the resource position information of the at least one sub-BP is not limited. In addition, when continuous encoding is performed for different terminal devices, for example, when three sub-BPs are allocated to a terminal device 1 and are respectively numbered 1, 2, and 3, and when two sub-BPs are allocated to a terminal device 2, the two sub-BPs are sequentially numbered 4 and 5. For the implementation of the resource position information of the at least one sub-BP, refer to the specific implementations of the resource position information of the at least one sub-BP in Example 1, Example 2, and Example 3.

Figure 6:
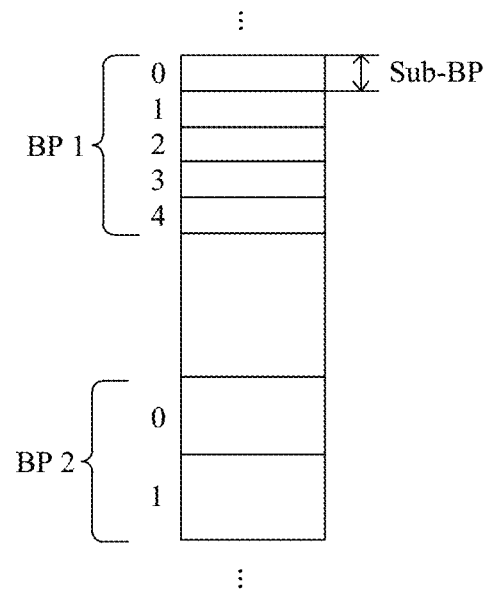
FIG. 6 is a schematic diagram of configuration of a sub-BP according to an embodiment of this application.

In Example 4 and Example 5, LTE is used as an example, and descriptions in another communications system is similar to those in LTE. Details are not described herein one by one. Sizes of sub-BPs configured for different terminal devices in a same cell may be the same or may be different. As shown in FIG. 6, a BP 1 is a BP allocated by the base station to the terminal device 1, and a BP 2 is a BP allocated by the base station to the terminal device 2.

It should be noted that, the correspondence between the range of the maximum bandwidth supported by the terminal device and the sub-BP size set in Example 4 may be preconfigured into the terminal device and the base station. When the sub-BP size set includes only one sub-BP size, the base station does not need to notify the terminal device of the sub-BP size. When the sub-BP size set includes a plurality of sub-BP sizes, the base station needs to notify the terminal device of the sub-BP size.

In addition, in Example 4 and Example 5, the supported maximum bandwidth or the size of the bandwidth that is reported by the terminal device is specific to each terminal device. Therefore, usually, the correspondences of the sub-BP size set in Example 4 and Example 5 are preconfigured into the base station. The base station selects the size of the at least one sub-BP and then notifies the size of the at least one sub-BP to the terminal device.

In addition, when the terminal device supports a plurality of BP configuration parameters, in a specific implementation, optionally, one BP corresponds to one configuration parameter. The configuration parameter includes a subcarrier spacing, a time unit type, a cyclic prefix (CP) type, or the like. Using the subcarrier spacing as an example, if the terminal device supports a subcarrier spacing of 15 kHz and a subcarrier spacing of 30 kHz, the base station may allocate a BP having a subcarrier spacing of 15 kHz and a BP having a subcarrier spacing of 30 kHz to the terminal device. The terminal device switches to different BPs based on different scenarios and service requirements. Usually, the terminal device cannot simultaneously transmit data on two or more BPs.

It should be noted that, using the subcarrier spacing as an example, when the BP corresponds to the subcarrier spacing, the BP may be used to transmit physical channel information and/or physical signal information of the corresponding subcarrier spacing. When the BP configuration parameter includes one or more of the subcarrier spacing, the time unit type, or the CP type, an implementation is similar to the implementation in which the BP configuration parameter includes the subcarrier spacing, and details are not described herein again.

It should be understood that, in this embodiment of this application, when the BP corresponds to the configuration parameter, each of the at least one sub-BP may have a same or different size. Specifically, an example in which a subcarrier spacing corresponding to a BP 1 is 30 kHz is used for description. Assuming that the BP 1 includes a sub-BP 1, a sub-BP 2, and a sub-BP 3, the base station allocates a sub-BP size for each of the sub-BP 1, the sub-BP 2, and the sub-BP 3. For example, the sub-BP 1 includes two PRBs corresponding to 30 kHz, the sub-BP 2 includes four PRBs corresponding to 30 kHz, and the sub-BP 3 includes eight PRBs corresponding to 30 kHz. Optionally, the size of each sub-BP may be configured by the base station and notified to the terminal device. Specifically, the base station may send, to the terminal device, a number indicating each sub-BP and a corresponding sub-BP size; a relationship between a number of each sub-BP and a corresponding sub-BP size may be preconfigured in the terminal device and the base station; and so on. This is not specifically limited in this embodiment of this application.

Figure 7A:
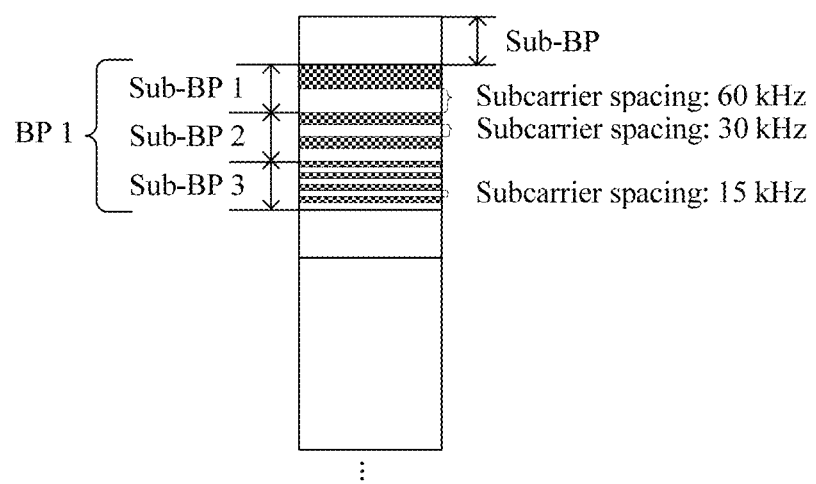
FIG. 7a and FIG. 7b are separately a schematic diagram of configuration of a sub-BP according to an embodiment of this application.

In this embodiment of this application, to satisfy different requirements, optionally, one sub-BP corresponds to one configuration parameter, and the configuration parameter corresponding to the sub-BP includes the subcarrier spacing, the time unit type, the CP type, or the like. Using the subcarrier spacing as an example, if the terminal device 1 supports subcarrier spacings of 60 kHz, 15 kHz, and 30 kHz, when each sub-BP has a same size, a BP 1 allocated to the terminal device 1 may be shown in FIG. 7*a*. The BP 1 includes a sub-BP 1, a sub-BP 2, and a sub-BP 3, and sizes of the sub-BP 1, the sub-BP 2, and the sub-BP 3 are the same. However, a subcarrier spacing corresponding to the sub-BP 1 is 60 kHz, a subcarrier spacing corresponding to the sub-BP 2 is 30 kHz, and a subcarrier spacing corresponding to the sub-BP 3 is 15 kHz. When each sub-BP has a different size, a BP 1 allocated to the terminal device 1 may be shown in FIG. 7*b*. The BP 1 includes a sub-BP 1, a sub-BP 2, and a sub-BP 3. A size of the sub-BP 1 is a MHz, a size of the sub-BP 2 is b MHz, and a size of the sub-BP 3 is c MHz, where a, b, and c are all rational numbers greater than 0, and a, b, and c are not equal to each other. A subcarrier spacing corresponding to the sub-BP 1 is 60 kHz, a subcarrier spacing corresponding to the sub-BP 2 is 30 kHz, and a subcarrier spacing corresponding to the sub-BP 3 is 15 kHz.

Figure 7B:
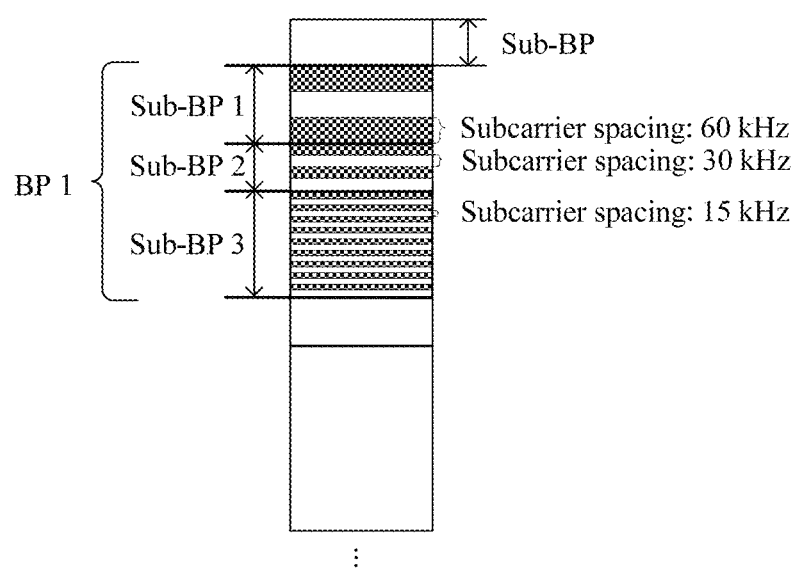

In addition, in this embodiment of this application, when one sub-BP corresponds to one configuration parameter, each of the at least one sub-BP may have a same or different size. Specifically, when each of the at least one sub-BP has a different size, the BP 1 shown in FIG. 7*b* is used as an example. The base station configures a sub-BP size for each of the subcarrier spacings of 60 kHz, 15 kHz, and 30 kHz. For example, a sub-BP size corresponding to 60 kHz is two PRBs corresponding to 60 kHz, a sub-BP size corresponding to 15 kHz is eight PRBs corresponding to 15 kHz, and a sub-BP size corresponding to 30 kHz is four PRBs corresponding to 30 kHz. The sub-BP size corresponding to each subcarrier spacing may be pre-defined. For example, the sub-BP sizes corresponding to 15 kHz, 30 kHz, and 60 kHz are defined as b kHz, where b is an integer greater than 0. Alternatively, the sub-BP sizes corresponding to 15 kHz, 30 kHz, and 60 kHz all include a PRBs, where a is an integer greater than 0. Alternatively, a sub-BP corresponding to 15 kHz includes c PRBs, a sub-BP corresponding to 30 kHz includes d PRBs, and a sub-BP corresponding to 60 kHz includes e PRBs, where c, d, and e are integers greater than 0. Optionally, the size of each sub-BP may be configured by the base station and notified to the terminal device. For example, the base station configures that the sub-BP corresponding to 15 kHz includes f PRBs and the sub-BP corresponding to 30 kHz includes g PRBs. When the base station allocates a BP to a user, sub-BP sizes corresponding to different subcarrier spacings may be included. For example, one BP includes five sub-BPs corresponding to a subcarrier spacing of 15 kHz, five sub-BPs corresponding to a subcarrier spacing of 30 kHz, and three sub-BPs corresponding to a subcarrier spacing of 60 kHz. Specifically, a physical channel signal and/or physical signal information having a subcarrier spacing of 15 kHz may be transmitted between the base station and the terminal device on a bandwidth part allocated by using the sub-BP corresponding to the subcarrier spacing of 15 kHz, a physical channel signal and/or physical signal information having a subcarrier spacing of 30 kHz may be transmitted between the base station and the terminal device on a bandwidth part allocated by using the sub-BP corresponding to the subcarrier spacing of 30 kHz, and a physical channel signal and/or physical signal information having a subcarrier spacing of 60 kHz may be transmitted between the base station and the terminal device on a bandwidth part allocated by using the sub-BP corresponding to the subcarrier spacing of 60 kHz.

Optionally, after the base station allocates a BP to the terminal, different frequency bands in the BP correspond to different configuration parameters. The configuration parameter includes the subcarrier spacing, the time unit type, the CP type, or the like. Using the subcarrier spacing as an example, one BP corresponds to two subcarrier spacings of 15 kHz and 30 kHz. The base station may notify the terminal by using signaling that the BP includes a bandwidth part corresponding to the subcarrier spacing of 15 kHz and a bandwidth part corresponding to the subcarrier spacing of 30 kHz. In a specific implementation, a resource occupied for transmission of physical channel information and/or physical signal information between the base station and the terminal may be pre-notified by the base station to the terminal device. For example, when a size of the BP is 30 MHz, the BP includes a bandwidth part of 10 MHz allocated by using a sub-BP corresponding to a subcarrier spacing of 30 kHz and a bandwidth part of 20 MHz allocated by using a sub-BP corresponding to a subcarrier spacing of 60 kHz. The base station sends the signaling to the terminal device to notify the terminal of the bandwidth parts that are included in the BP and that are used to transmit physical channel information and/or physical signal information of each subcarrier spacing. The terminal device transmits, on different bandwidth parts based on the notification of the base station, the physical channel information and/or the physical signal information of the corresponding subcarrier spacings. For example, the base station sends the signaling to notify the terminal device of the bandwidth part 10 MHz used to transmit physical channel information and/or physical signal information of 15 kHz and the bandwidth part 20 MHz used to transmit physical channel information and/or physical signal information of 30 kHz in the BP. Alternatively, transmitting which data on which bandwidth part is pre-agreed between the base station and the terminal device. For example, it is pre-agreed that physical channel information and/or physical signal information having a subcarrier spacing of 15 kHz is transmitted on the bandwidth part allocated by using the sub-BP corresponding to the subcarrier spacing of 15 kHz and data having a subcarrier spacing of 30 kHz is transmitted on the bandwidth part allocated by using the sub-BP corresponding to the subcarrier spacing of 30 kHz. Therefore, the physical channel information and/or the physical signal information is transmitted between the base station and the terminal device on the allocated BP based on the pre-agreement.

In this embodiment of this application, the configuration parameter may also be referred to as a numerology.

Based on a same concept, an embodiment of this application further provides a network device, and the network device is configured to perform an action or a function of the network device in the foregoing method embodiments.

Based on a same concept, an embodiment of this application further provides a terminal device, and the terminal device is configured to perform an action or a function of the terminal device in the foregoing method embodiments.

An embodiment of this application further provides a communications system, including the network device and the terminal device in the foregoing embodiments.

For brevity, for content in an apparatus part, specifically refer to the method embodiments. Details are not repeatedly described.

Figure 8A:
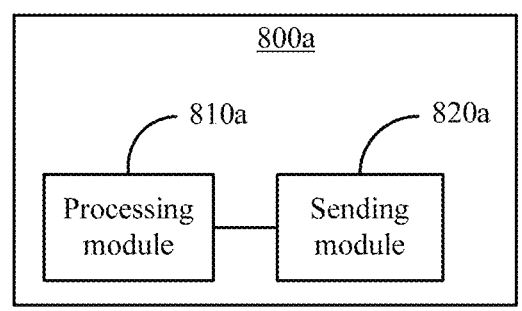
FIG. 8a and FIG. 8b are separately a schematic structural diagram of a network device according to an embodiment of this application.

As shown in FIG. 8*a*, a network device 800*a* in an embodiment of this application includes a processing module 810*a* and a sending module 820*a*. The processing module 810*a* is configured to allocate a bandwidth part BP to a terminal device, where the BP includes at least one sub-BP, and the BP is not greater than a maximum bandwidth supported by the terminal device. The sending module 820a is configured to send, to the terminal device, a first message indicating a resource position of the BP, where the first message includes resource position information of the at least one sub-BP.

In an embodiment, a size of the at least one sub-BP is a sub-BP size included in a first sub-BP size set, and the first sub-BP size set includes at least one sub-BP size.

The first sub-BP size set corresponds to a first carrier frequency range, and the first carrier frequency range includes a carrier frequency used for signal transmission between the network device and the terminal device; or the first sub-BP size set corresponds to a first system bandwidth range, and the first system bandwidth range includes a system bandwidth of the network device; or the first sub-BP size set is a pre-defined sub-BP size set.

In an embodiment, each of the at least one sub-BP has a same size.

In an embodiment, the sending module 820a is further configured to send first indication information to the terminal device, where the first indication information is used to indicate the size of the at least one sub-BP.

In an embodiment, the resource position information of the at least one sub-BP is a start number and an end number of the sub-BP included in the BP; or the resource position information of the at least one sub-BP is a start number of the sub-BP included in the BP and a quantity of sub-BPs included in the BP.

In an embodiment, the sending module 82a is further configured to send second indication information to the terminal device, where the second indication information is used to indicate a size of the at least one sub-BP, the size of the at least one sub-BP is a sub-BP size included in a second sub-BP size set, the second sub-BP size set includes at least one sub-BP size, and the second sub-BP size set corresponds to a first bandwidth range.

The first bandwidth range includes the maximum bandwidth supported by the terminal device; or a first sub-bandwidth range includes a size of a bandwidth reported by the terminal device to the network device.

In an embodiment, the resource position information of the at least one sub-BP is a start frequency domain position of the BP and a quantity of sub-BPs included in the BP.

In an embodiment, the BP corresponds to a configuration parameter, and the configuration parameter includes a sub-carrier spacing, a time unit type, or a cyclic prefix CP type.

In an embodiment, the sub-BP corresponds to a configuration parameter, and the configuration parameter includes a subcarrier spacing, a time unit type, or a CP type.

Figure 8B:
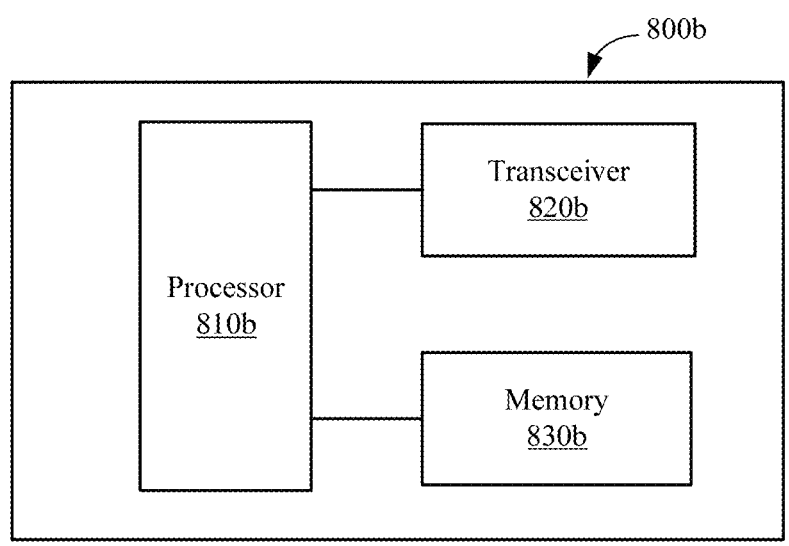

It should be noted that, in this embodiment of this application, the processing module 810a may be implemented by a processor, and the sending module 820a may be implemented by a transmitter. As shown in FIG. 8b, a network device 800b may include a processor 810b, a transceiver 820b, and a memory 830b. The transceiver 820b includes a receiver and a transmitter. The memory 830b may be configured to store a program/code pre-installed when the network device 800b is at delivery, or may store code executed by the processor 810b, or the like.

The processor 810b may be a general-purpose central processing unit ( ), a microprocessor, an application-specific integrated circuit (ASIC), or one or more integrated circuits, and is configured to perform a related operation, to implement the technical solution provided in this embodiment of this application.

It should be noted that although only the processor 810b, the transceiver 820b, and the memory 830b are shown for the network device 800b shown in FIG. 8b, in a specific implementation process, persons skilled in the art should understand that the network device 800b further includes another component necessary for normal running. In addition, persons skilled in the art should understand that, based on a specific requirement, the network device 800b may further include a hardware component for implementing another additional function. In addition, persons skilled in the art should understand that the network device 800b may include only components or modules necessary for implementing this embodiment of this application, but does not need to include all the components shown in FIG. 8b.

Persons of ordinary skill in the art may understand that all or some of the processes of the methods in the embodiments may be implemented by a computer program instructing relevant hardware. The program may be stored in a computer readable storage medium. When the program is run, the processes of the methods in the embodiments may be performed. The foregoing storage medium may be a magnetic disk, a compact disc, a read-only memory (ROM), a random access memory (RAM), or the like.

Figure 9A:
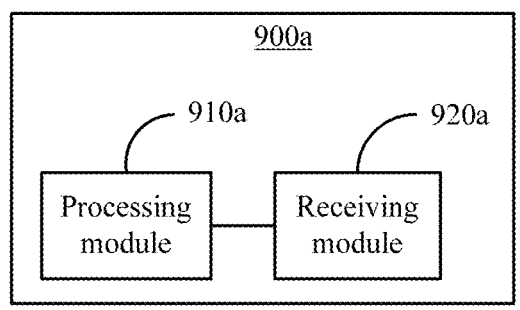
FIG. 9a and FIG. 9b are separately a schematic structural diagram of a terminal device according to an embodiment of this application.

As shown in FIG. 9a, a terminal device 900a in an embodiment of this application includes a processing module 910a and a receiving module 920a. The receiving module 920a is configured to receive a first message that is sent by a network device and that indicates a resource position of a bandwidth part BP, where the BP includes at least one sub-BP, and the first message includes resource position information of the at least one sub-BP. The processing module 910a is configured to determine the resource position of the BP based on the resource position information of the at least one sub-BP.

In an embodiment, a size of the at least one sub-BP is a sub-BP size included in a first sub-BP size set, and the first sub-BP size set includes at least one sub-BP size.

The first sub-BP size set corresponds to a first carrier frequency range, and the first carrier frequency range includes a carrier frequency used for signal transmission between the network device and the terminal device; or the first sub-BP size set corresponds to a first system bandwidth range, and the first system bandwidth range includes a system bandwidth of the network device; or the first sub-BP size set is a pre-defined sub-BP size set.

In an embodiment, each of the at least one sub-BP has a same size.

In an embodiment, the receiving module 920a is further configured to receive first indication information sent by the network device, where the first indication information is used to indicate the size of the at least one sub-BP.

In an embodiment, the resource position information of the at least one sub-BP is a start number and an end number of the sub-BP included in the BP; or the resource position information of the at least one sub-BP is a start number of the sub-BP included in the BP and a quantity of sub-BPs included in the BP.

In an embodiment, the receiving module 920a is further configured to receive second indication information sent by the network device, where the second indication information is used to indicate a size of the at least one sub-BP, the size of the at least one sub-BP is a sub-BP size included in a second sub-BP size set, the second sub-BP size set includes at least one sub-BP size, and the second sub-BP size set corresponds to a first bandwidth range.

The first bandwidth range includes a maximum bandwidth supported by the terminal device; or a first sub-bandwidth range includes a size of a bandwidth reported by the terminal device to the network device.

In an embodiment, the resource position information of the at least one sub-BP is a start frequency domain position of the BP and a quantity of sub-BPs included in the BP.

In an embodiment, the BP corresponds to a configuration parameter, and the configuration parameter includes a subcarrier spacing, a time unit type, or a CP type.

In an embodiment, the sub-BP corresponds to a configuration parameter, and the configuration parameter includes a subcarrier spacing, a time unit type, or a CP type.

Figure 9B:
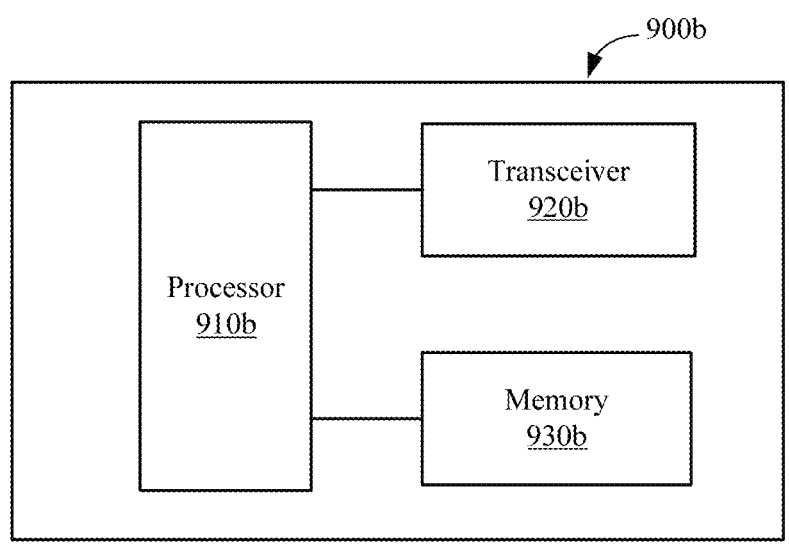

It should be noted that, in this embodiment of this application, the processing module 910a may be implemented by a processor, and the receiving module 920a may be implemented by a receiver. As shown in FIG. 9b, a terminal device 900b may include a processor 910b, a transceiver 920b, and a memory 930b. The transceiver 920b includes a receiver and a transmitter, the memory 930b may be configured to store a program/code pre-installed when the terminal device 900b is at delivery, or may store code executed by the processor 910b, or the like.

The processor 910b may be a general-purpose CPU, a microprocessor, an ASIC, or one or more integrated circuits, and is configured to perform a related operation, to implement the technical solution provided in this embodiment of this application.

It should be noted that although only the processor 910b, the transceiver 920b, and the memory 930b are shown for the terminal device 900b shown in FIG. 9b, in a specific implementation process, persons skilled in the art should understand that the terminal device 900b further includes another component necessary for normal running. In addition, persons skilled in the art should understand that, based on a specific requirement, the terminal device 900b may further include a hardware component for implementing another additional function. In addition, persons skilled in the art should understand that the terminal device 900b may include only components or modules necessary for implementing this embodiment of this application, but does not need to include all the components shown in FIG. 9b.

Persons of ordinary skill in the art may understand that all or some of the processes of the methods in the embodiments may be implemented by a computer program instructing relevant hardware. The program may be stored in a computer readable storage medium. When the program is run, the processes of the methods in the embodiments may be performed. The foregoing storage medium may be a magnetic disk, a compact disc, a ROM, a RAM, or the like.

Figure 10:
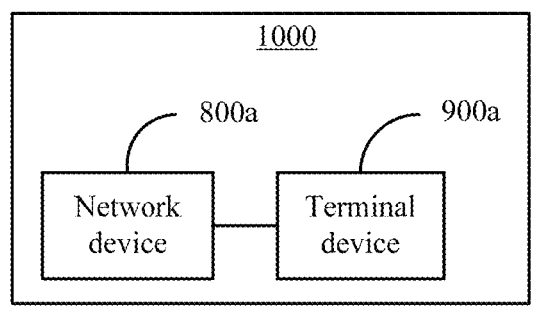
FIG. 10 is a schematic structural diagram of a communications system according to an embodiment of this application.

As shown in FIG. 10, a communications system 1000 in an embodiment of this application includes a network device 800a and a terminal device 900a.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may also be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto the computer or the another programmable data processing device, so that a series of operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed to cover the embodiments of this application and all changes and modifications falling within the scope of this application.

Apparently, persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:
1. A resource indication method, comprising:
allocating, by a network device, a bandwidth part (BP) to a terminal device, wherein the BP comprises at least one sub-BP, and wherein the BP is not greater than a maximum bandwidth supported by the terminal device, wherein each of the at least one sub-BP corresponds to a configuration parameter that comprises a cyclic prefix (CP) type, and has a same size;
sending, by the network device to the terminal device, indication information that indicates the size of each of the at least one sub-BP, wherein the size is represented by a specific frequency value; and
sending, by the network device to the terminal device, a first message indicating a resource position of the BP, wherein the message comprises resource position information of the at least one sub-BP, wherein the resource position information of the at least one sub-BP is a start frequency domain position of the BP and a quantity of sub-BPs comprised in the BP.

2. The method according to claim 1,
wherein the size of each of the at least one sub-BP is a sub-BP size comprised in a first sub-BP size set, which comprises at least one sub-BP size; and
wherein the first sub-BP size set corresponds to one of the following:
a first carrier frequency range comprising a carrier frequency used for signal transmission between the network device and the terminal device;
a first system bandwidth range comprising a system bandwidth of the network device; or
a pre-defined sub-BP size set.

3. The method according to claim 1,
wherein the size of each of the at least one sub-BP is a sub-BP size comprised in a second sub-BP size set, the second sub-BP size set comprising at least one sub-BP size and corresponding to a first bandwidth range, wherein the first bandwidth range comprises the maximum bandwidth supported by the terminal device or comprises a size of a bandwidth reported by the terminal device to the network device.

4. The method according to claim 1, wherein the BP corresponds to a configuration parameter, which comprises a subcarrier spacing, a time unit type, or a cyclic prefix (CP) type.

5. The method according to claim 1, wherein the configuration parameter corresponding to each of the at least one sub-BP further comprises a subcarrier spacing, or a time unit type.

6. A resource indication method, comprising:
receiving, by a terminal device, a first message that is sent by a network device and that indicates a resource position of a bandwidth part(BP), wherein the BP comprises at least one sub-BP, and wherein the first message comprises resource position information of the at least one sub-BP, wherein the resource position information of the at least one sub-BP is a start frequency domain position of the BP and a quantity of sub-BPs comprised in the BP, wherein each of the at least one sub-BP corresponds to a configuration parameter that comprises a cyclic prefix (CP) type, and has a same size;
receiving, by the terminal device from the network device, first indication information that indicates the size of each of the at least one sub-BP, wherein the size is represented by a specific frequency value; and
determining, by the terminal device, the resource position of the BP based on the resource position information of the at least one sub-BP.

7. The method according to claim 6,
wherein the size of each of the at least one sub-BP is a sub-BP size comprised in a first sub-BP size set, which comprises at least one sub-BP size; and
wherein the first sub-BP size set corresponds to one of the following:
a first carrier frequency range comprising a carrier frequency used for signal transmission between the network device and the terminal device;
a first system bandwidth range comprising a system bandwidth of the network device; or
a pre-defined sub-BP size set.

8. The method according to claim 6,
wherein the size of each of the at least one sub-BP is a sub-BP size comprised in a second sub-BP size set, the second sub-BP size set comprising at least one sub-BP size and corresponding to a first bandwidth range, wherein the first bandwidth range comprises a maximum bandwidth supported by the terminal device or comprises a size of a bandwidth reported by the terminal device to the network device.

9. The method according to claim 6, wherein the BP corresponds to a configuration parameter, which comprises a subcarrier spacing, a time unit type, or a cyclic prefix CP type.

10. The method according to claim 6, wherein the configuration parameter corresponding to each of the at least one sub-BP further comprises a subcarrier spacing, or a time unit type.

11. A terminal device, comprising:
a transceiver, configured to
receive a first message that is sent by a network device and that indicates a resource position of a bandwidth part (BP), wherein the BP comprises at least one sub-BP, and wherein the first message comprises resource position information of the at least one sub-BP, wherein the resource position information of the at least one sub-BP is a start frequency domain position of the BP and a quantity of sub-BPs comprised in the BP, wherein each of the at least one sub-BP corresponds to a configuration parameter that comprises a cyclic prefix (CP) type, and has a same size, and
receive, from the network device, first indication information that indicates the size of each of the at least one sub-BP, wherein the size is represented by a specific frequency value; and
a processor, configured to determine the resource position of the BP based on the resource position information of the at least one sub-BP.

12. The terminal device according to claim 11, wherein the size of each of the at least one sub-BP is a sub-BP size comprised in a first sub-BP size set, which comprises at least one sub-BP size; and
wherein the first sub-BP size set corresponds to a first carrier frequency range, which comprises a carrier frequency used for signal transmission between the network device and the terminal device; or the first sub-BP size set corresponds to a first system bandwidth range, and the first system bandwidth range comprises a system bandwidth of the network device; or the first sub-BP size set is a pre-defined sub-BP size set.

13. The terminal device according to claim 11, wherein the size of each of the at least one sub-BP is a sub-BP size comprised in a second sub-BP size set, the second sub-BP size set comprising at least one sub-BP size and corresponding to a first bandwidth range, wherein the first bandwidth range comprises a maximum bandwidth supported by the terminal device or comprises a size of a bandwidth reported by the terminal device to the network device.

14. The terminal device according to claim 11, wherein the BP corresponds to a configuration parameter, which comprises a subcarrier spacing, a time unit type, or a cyclic prefix CP type.

15. The terminal device according to claim 11, wherein the configuration parameter corresponding to each of the at least one sub-BP further comprises a subcarrier spacing, or a time unit type.

* * * * *